No. 885,390. PATENTED APR. 21, 1908.
G. SITTMANN.
REVERSING MECHANISM.
APPLICATION FILED MAR. 16, 1907.
3 SHEETS—SHEET 1.
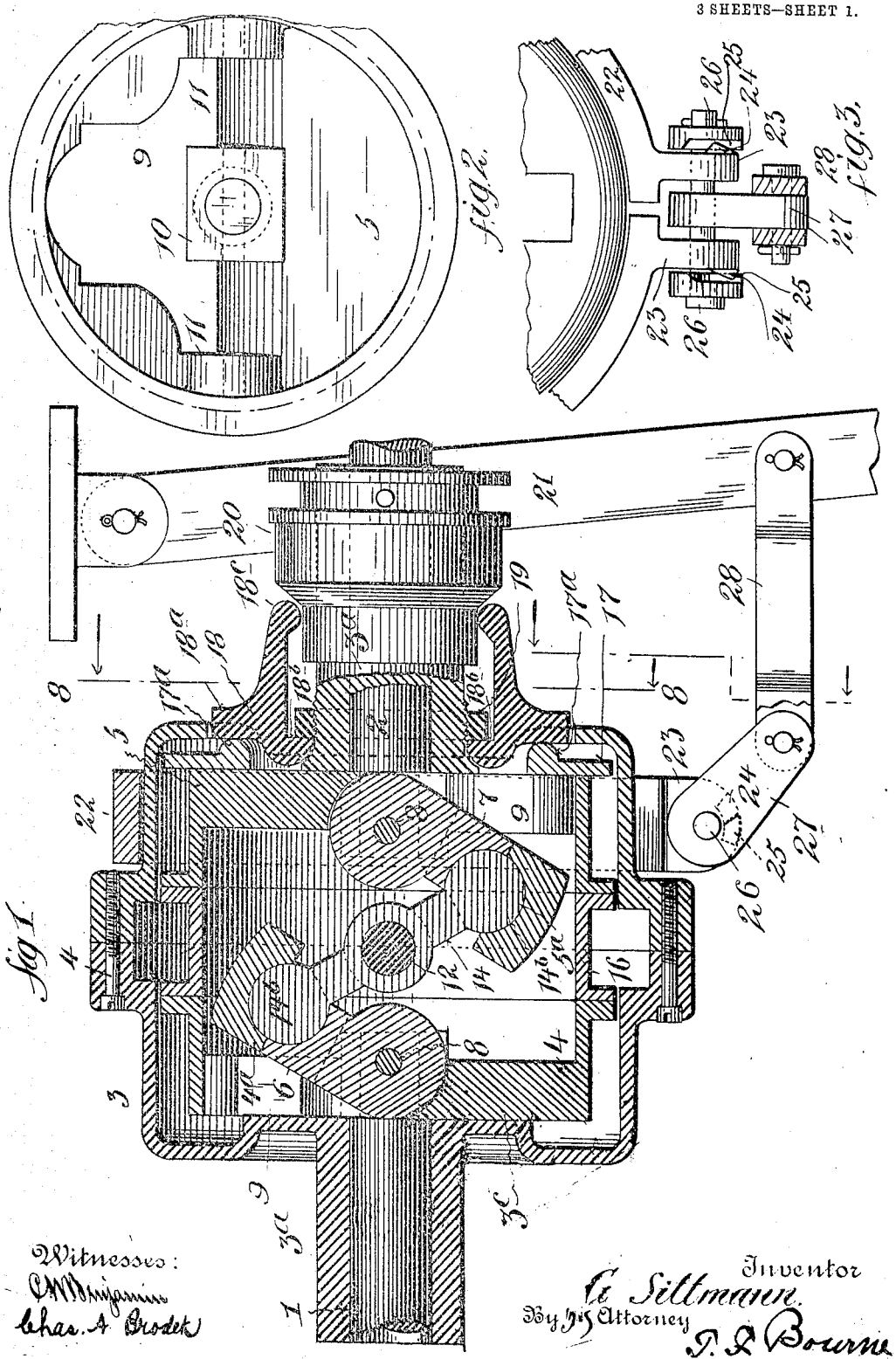

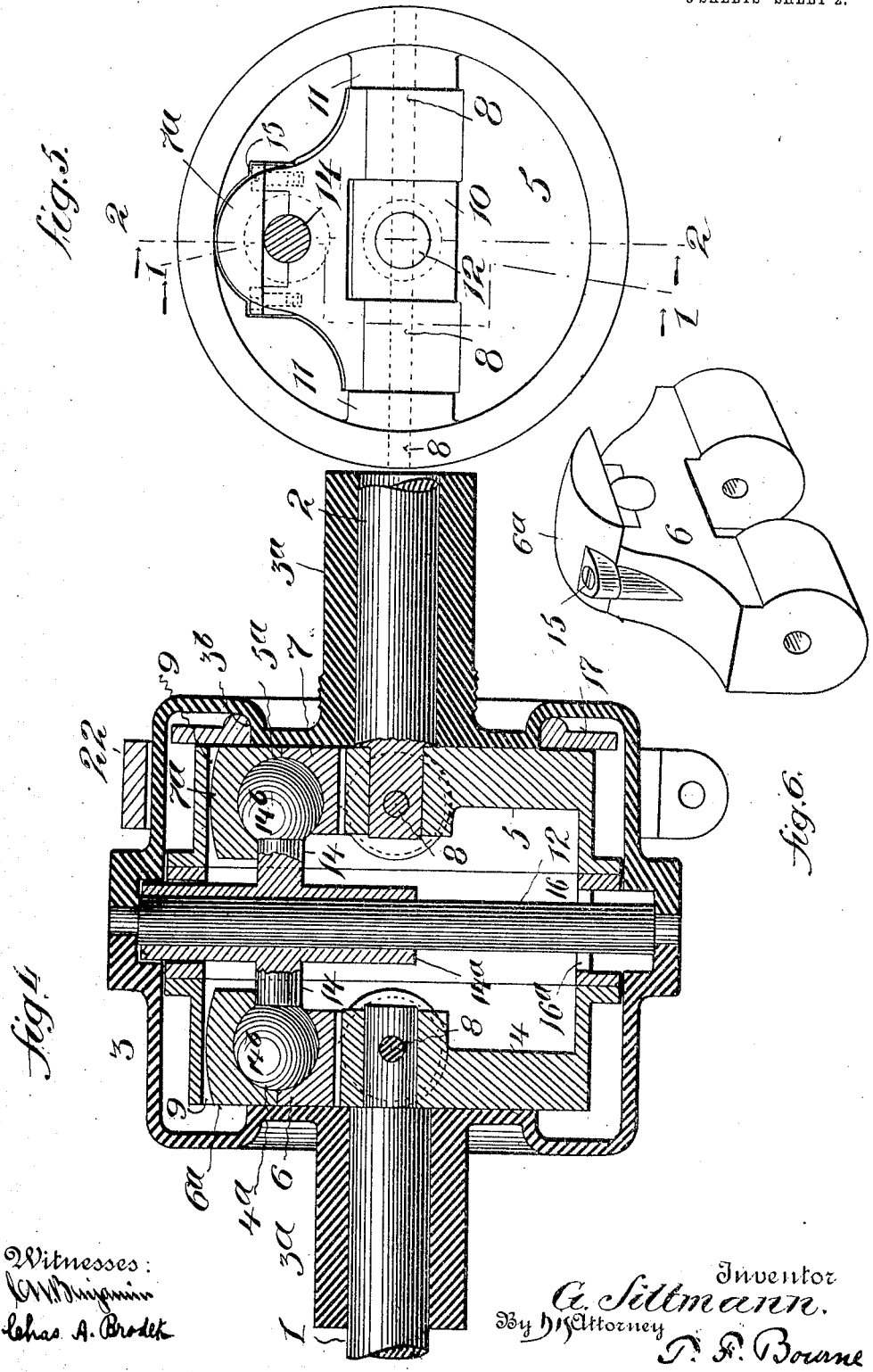

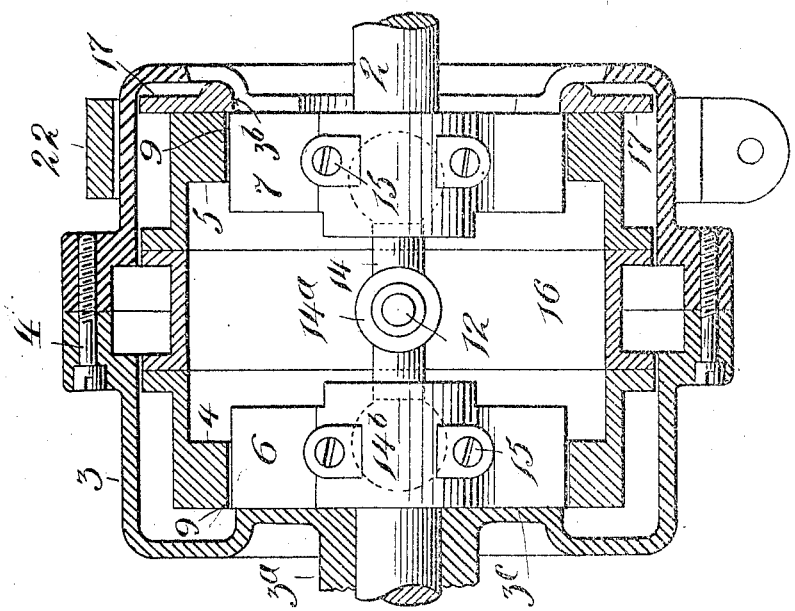
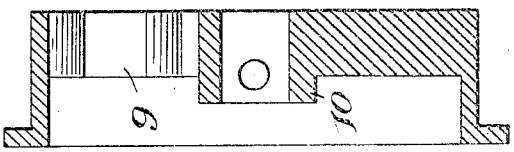
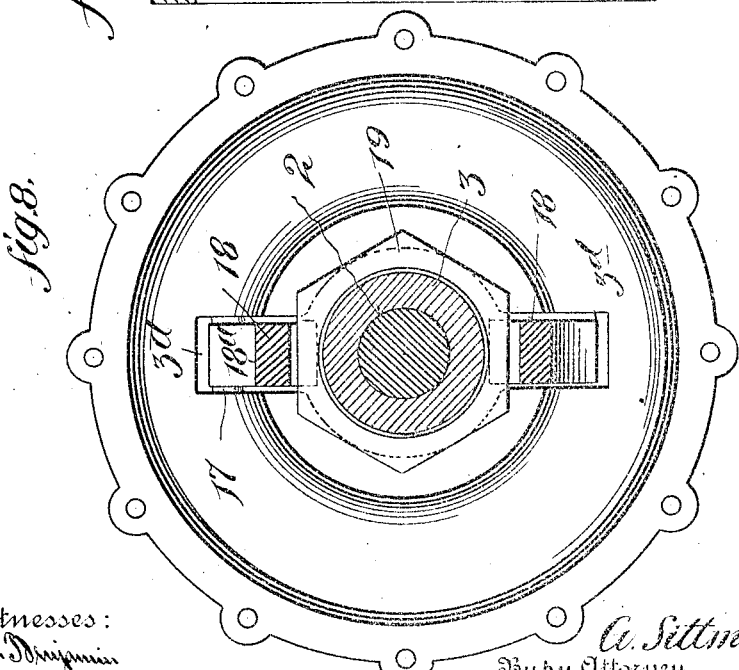

UNITED STATES PATENT OFFICE.

GUSTAV SITTMANN, OF NEW YORK, N. Y.

REVERSING MECHANISM.

No. 885,390.     Specification of Letters Patent.     Patented April 21, 1908.

Application filed March 16, 1907. Serial No. 362,604.

*To all whom it may concern:*

Be it known that I, GUSTAV SITTMANN, a citizen of the United States, and resident of New York city, borough of Brooklyn, State of New York, have invented certain new and useful Improvements in Reversing Mechanism, of which the following is a specification.

The object of my invention is to provide simple and efficient means for rotating a shaft forward or reverse at will from a shaft usually driven in one direction, and my invention comprises the details of improvement and the combinations of parts that will be more fully hereinafter set forth and then pointed out in the claims.

Reference is to be had in the accompanying drawings forming part hereof, wherein, Figure 1 is a central sectional view of a reversing mechanism embodying my invention.
Fig. 2 is a face view of one of the disks. Fig. 3 is a detail view of brake controlling means. Fig. 4 is a sectional view substantially at right angles to Fig. 1, Fig. 5 is a face view of one of the driving disks and its lever. Fig. 6 is a detail perspective view of said lever. Fig. 7 is a sectional view showing parts in full lines. Fig. 8 is a sectional view substantially on the line 8, 8 in Fig. 1, Fig. 9 is a sectional view of one of the rotating disks.
Similar numerals of reference indicate corresponding parts in the several views.

The numeral 1 indicates a driving shaft which may be supported and rotated in any suitable manner and 2 indicates a shaft to be driven forward and reverse by shaft 1.

3 indicates a suitable casing which is shown provided with hubs 3ª mounted upon shafts, 1, 2, and casing 3 is shown divided and its parts connected rigidly, as by screws 4.
Within casing 3 and secured upon the ends of shafts 1, 2, are disks or lever supports 4, 5 adapted to rotate therewith within the casing. The disks or supports 4, 5 pivotally carry levers 6, 7 which are shown mounted upon shafts 8, supported by said disks. The disks 4, 5 are shown provided with recesses 9, into which the levers 6, 7 are adapted to pass. I have shown said levers as bifurcated and receiving between them the projecting parts 10 of said disks, abutments 11 of said disks being shown located adjacent opposite ends of said levers, whereby the shafts 8 are relieved from twisting strains.

At 12 is a rod or shaft secured to and projecting across casing 3 and substantially midway between disks 4, 5. Said rod or shaft 12 may be rigidly secured in place in suitable sockets between the members of the casing 3.

At 14 is a lever or arm mounted to slide upon rod or shaft 12 and projecting on opposite sides of the latter, being shown provided with hubs 14ª upon opposite sides, mounted to slide upon rod or shaft 12. The lever or arm 14 is pivotally connected with the levers 6, 7, for which purpose I have shown the lever 14 as provided with spherical ends 14ᵇ journaled in bearings or seats 4ª, 5ª, of levers 6, 7. For convenience in connecting the levers 6, 7 and 14 I have shown the levers 6, 7 provided with caps 6ª, 7ª secured upon the levers by screws 15, the seats 4ª, 5ª being shown formed partly in the levers and partly in their caps.

Between the inner faces of the disks 4, 5, is located a loose ring 16 provided with opposed openings 16ª through which shaft 12 passes and also through which the hubs 14ª are adapted to slide. The ring 16 may be guided on its edges by casing 3, and the meeting faces of the disks 4, 5 and ring 16 are preferably ground.

Means are provided for firmly clamping one of the shafts 1 or 2 to casing 3, so that all the parts will rotate in unison in the same direction, and for this purpose I have shown a friction ring 17 mounted loosely upon the hub portion 3ᵈ of casing 3 and within the latter, said ring being adapted to bear against the outer face of disk 5 for frictional engagement therewith.

At 18 are dogs adapted to bear at their projected parts 18ª against ring 17, or the projection 17ª thereof, casing 3 having slots 3ᵈ for the passage of projection 18ª. Said dogs also have projections or hooks 18ᵇ adapted to engage a collar 19 mounted upon hub 3ª of casing 3, as by intermeshing screw threads, any suitable means being provided for locking collar 19 in set position. The outer ends 18ᶜ of said dogs are adapted to be engaged by a suitable cone-like sleeve 20 mounted to slide upon hub 3ª. Any suitable means, such as a lever 21 suitably connected with sleeve 20, may be provided for shifting said sleeve while permitting its rotation. When sleeve 20 is in the position shown in Fig. 1, the parts are free to operate independently, but when sleeve 20 is pushed to the left (Fig. 1) to expand dogs 18, they will push ring 17 against disk 5, and the latter pushes ring 16 against disk 4, which in turn is pushed against the face 3ᶜ of casing 3, whereby all the parts are locked together, and shafts 1, 2 will revolve at the same speed, in the same direction. The parts 6, 7, 12 and 14 are thus relieved from driving strain in said direction of rotation. To cause shaft 2 to rotate reverse to shaft 1, sleeve 20 is released from dogs 18 and casing 3 is held from rotation by any suitable means. For this purpose I have shown a band 22 surrounding the casing adapted to frictionally grip the same. This band may be operated by any suitable means. I have shown band 22 provided with lugs 23 having projections or cams 24 adapted to be engaged by corresponding projections or cams 25 carried rigidly by a shaft 26 journaled in lugs 23 and provided with a crank 27 connected by a link 28 with lever 21. The relation of these parts is such that when lever 21 is shifted to the right in Fig. 1, the sleeve 20 will release dogs 18 and band 22 will grip casing 3 to keep it from rotating, and when lever 21 is moved to the left in Fig. 1, band 22 will release casing 3 and sleeve 20 will cause dogs 18 to operate ring 17 to lock the parts together.

The operation of my improvements may be described as follows:—Assuming that shaft 1 be driven continually in one direction, as from a gas engine, and that shaft 2 be connected with the propeller of a boat, and that it is desired to drive the boat forwardly, lever 21 will be shifted to the left in Fig. 1 from the neutral position shown in said figure to cause dogs 18 and ring 17 to lock the parts firmly together, and thereupon shaft 2 will rotate at the same speed and in the same direction as shaft 1. When it is desired to reverse the direction of rotation of shaft 2 and its propeller the lever 21 is shifted to the right in Fig. 1 to release dogs 18 and ring 17, and cause band 22 to grip casing 3, the cams 25 then engaging cams 24, the rotation of shaft 1 in the same direction as before mentioned now causing the lever or arm 14, by reason of its pivotal connection with shaft 12, to rock on its axis around said shaft, and its end connected with lever 7, by moving in a direction reverse to the movement of the point of connection of lever 14 with lever 6, thereby causes disk 5 and shaft 2 to reverse in direction, and simultaneously lever 14 will slide back and forth along shaft 12 to compensate for the angular relations assumed by levers 6, 7, which also rock on their pivots into and from the openings 9 of disks 4, 5. Fig. 1 shows levers 6, 7 and 14 in one position while Fig. 4 shows a different position they have assumed while rotating from the position shown in Fig. 1.

By means of my improvements a simple reversing mechanism may be produced not requiring gear wheels and while I have shown and described an embodiment of my invention, the arrangements may be changed without departing from the spirit thereof.

Having now described my invention, what I claim is:—

1. A reversing mechanism comprising a casing, driving and driven shafts, means interposed between said shafts to limit the thrust of said shafts toward each other, a lever movably supported between said shafts, means for pivotally connecting said lever with said shafts, means to lock said shafts firmly to said casing, and means to hold said lever from rotating with said shafts while permitting it to rock and slide with respect to said shafts.

2. A reversing mechanism comprising driving and driven shafts, a thrust ring between said shafts, a lever interposed between said shafts, a pivotal support for said lever adapted to permit lateral bodily movement thereof, means for pivotally connecting said lever with said shafts, means for limiting rotation of said lever-support, and means for locking said parts firmly together.

3. A reversing mechanism comprising a casing, driving and driven shafts located in substantial axial alinement, means interposed between said shafts to limit the thrust of said shafts toward each other, levers pivotally connected with said shafts, a lever interposed between and pivotally connected with the first named levers, a pivotal support for the second named lever adapted to permit it to rock and also move laterally, means to limit rotation of said lever-support, and means to lock said shaft firmly to said casing.

4. A reversing mechanism comprising a pair of shafts located in substantial axial alinement, a thrust ring between said shafts, levers pivotally connected with said shafts, a casing surrounding said levers, a support carried by said casing, a lever mounted upon said support and adapted to rock and also slide bodily laterally, said lever being pivotally connected with the first named levers, means to limit rotation of said casing and means to lock said shafts firmly to said casing.

5. A reversing mechanism comprising a pair of shafts provided with disks, a ring between said disks, a casing surrounding said disks and provided with a support, a lever movably mounted upon said support, means for pivotally connecting said lever with said shafts, means to limit rotation of said casing, and means to lock said parts firmly together.

6. A reversing mechanism comprising a pair of shafts provided with disks, a ring between and adapted to bear upon said disks, a casing surrounding said disks and provided with a support, a lever movably mounted upon said support and adapted to rock and move laterally, levers pivotally connected with said shafts and with said first named lever, means to limit rotation of said casing, and means to lock said parts firmly together.

7. A reversing mechanism comprising a pair of shafts provided with disks having working faces, a loose ring between said disks provided with corresponding working faces, a casing surrounding said disks and provided with a support, a lever slidably mounted upon said support and adapted to rock thereon, levers pivotally connected with said shafts and with said first named lever, means to limit rotation of said lever, and means to lock said parts firmly together.

8. A reversing mechanism comprising a pair of shafts provided with disks having inner and outer working faces, a casing surrounding said disks and provided with a working face to engage the face of one of said disks, a loose ring between said disks provided with working faces to co-act with corresponding faces of said disks, a support carried by said casing, a lever slidably mounted upon said support and adapted to rock thereon, levers pivotally connecting said shafts with the first-named lever, friction devices to engage one of said disks, means to operate said friction devices for locking the parts firmly together, and means to limit rotation of said casing.

9. A reversing mechanism comprising a pair of shafts provided with disks having inner and outer working faces, a casing surrounding said disks and provided with a working face to engage the face of one of said disks, a loose ring between said disks provided with working faces to co-act with corresponding faces of said disks, a support carried by said casing, a lever slidably mounted upon said support and adapted to rock thereon, levers pivotally connecting said shafts with the first named lever, a friction ring within said casing to engage a face of one of said disks, dogs movably supported and projecting through openings in said casing to engage said friction ring, means connected with the adjacent disk to serve as fulcrums for said dogs, means to operate said dogs, and means to limit rotation of said casing.

GUSTAV SITTMANN.

Witnesses:
T. F. BOURNE,
RALPH N. RAPHAEL.